Feb. 10, 1970  D. P. COMEY  3,494,202
HYDRAULIC LEVEL INDICATING INSTRUMENT
Filed Dec. 5, 1967  4 Sheets-Sheet 3

Feb. 10, 1970   D. P. COMEY   3,494,202
HYDRAULIC LEVEL INDICATING INSTRUMENT
Filed Dec. 5, 1967   4 Sheets-Sheet 4

United States Patent Office 3,494,202
Patented Feb. 10, 1970

3,494,202
HYDRAULIC LEVEL INDICATING INSTRUMENT
David P. Comey, Waverley Ridge Road, Mount Lofty,
South Australia, Australia
Filed Dec. 5, 1967, Ser. No. 688,034
Claims priority, application Great Britain, Dec. 5, 1966,
14,824/66
Int. Cl. G01f 15/14; G01k 1/08; G01j 5/04
U.S. Cl. 73—432           8 Claims

ABSTRACT OF THE DISCLOSURE

Hydraulic indicator for determining relative levels of surfaces wherein a pressure responsive element is coupled by a flexible hose to a reservoir containing liquid. The pressure responsive element is either a hand piece having a clock face readout indicating level difference, or is a machine mounted element having its readout coupled to servo control means. The device functions regardless of whether the pressure responsive element is above or below the reservoir.

---

This invention relates to a level indicating instrument which may either be a hand instrument wherein a readout member is read by the eye or alternatively an instrument wherein the readout member is coupled to a servo system, for example for controlling the level of a machine.

The usual practice for determining levels is to employ a theodolite, dumpy level or the like wherein it is necessary to employ a line of sight, but this is slow and tedious and frequently requires the employment of two or more operators. Furthermore, comparative levels of two points frequently have to be determined by taking more than one line of sight reading for those points if they are obscured from one another.

To overcome this problem it has been proposed to utilise long transparent sight glasses interconnected by flexible hose, and to compare levels by partly filling the sight glasses with a liquid such as water or mercury and measuring distance of the points the levels of which are to be determined from liquid levels. While this system has the advantage of giving a more readily obtained reading for points which are obscured from one another say for example in building construction, nevertheless two operators are required, the equipment is usually cumbersome, and the readings are indirect.

One of the objects of this invention is to provide a simple instrument which will eliminate the need for line poles and line transparent sight gauge types in the indicating part of the system, and make possible the use of a simple and compact device which is easily stored and transported, and wherein the readout member moves in response to elevational changes so that a direct reading can be obtained. This object can be achieved by the feature of a pressure responsive element which is responsive to pressure in a system which has a reservoir and contains liquid and does not rely upon comparison of liquid levels as the basis of measurement.

Existing hydrostatic systems cannot be used when the indicator is at a higher level than the required level in a reservoir, and this is most inconvenient in many applications of level measurement, particularly where the level to be measured is above a convenient location for the reservoir of the hydrostatic system. A second object of this invention is to provide means whereby level can be measured regardless of whether the indicator is below the level of the liquid in the reservoir. This object is achieved by a feature of having a system with one surface only of the liquid contained therein subject to atmospheric pressure, the system otherwise being closed by a movable member in a pressure responsive element, the movable member for example can be constituted by a piston slidable in a cylinder, but is preferably in the form of a diaphragm, bellows, or diaphragm stack.

Existing hydrostatic systems are useful for determining level differences only within the limits of the length of the transparent sight gauges, and, for example, if sight gauges are five feet in length on an existing system they cannot be used to determine level difference in excess of five feet. A further object of this invention is to provide means whereby such limitations do not exist when the indicating element is at a level below the surface of liquid in the reservoir, and this object can be achieved by the feature of a spring applying a force to the movable member of a pressure responsive element.

One of the difficulties encountered with the existing hydrostatic systems is that of obtaining accurate readings, and problems include the problem of determining accurately what part of a minuscus on the surface of liquid should be taken as a datum, and one of the objects of this invention is to provide a system wherein a higher accuracy can be obtained than heretofore. This object may be achieved in accordance with this invention by having a reservoir with a surface area which is large compared with the effective area of the movable member of the instrument, and also by arranging the movable member to displace only relatively small volumes in response to pressure change.

Previously proposed hydrostatic systems have not been suitable for automatic control of machines for example, and a further object of this invention is to provide an instrument which can be used as a transducer for servo control of a machine or system, and this object can be achieved by this invention by employing a mechanically movable readout member coupled to the movable member which moves in response to pressure change. This also makes possible a compact readout device, for example a pointer and scale of the watch face type, or a digital counter.

In one of its forms the invention may be said to consist of a level indicating instrument having a reservoir, a pressure responsive element, and a flexible hose interconnecting the reservoir with the pressure responsive element, the pressure responsive element having walls and a movable member defining a pressure space, spring means applying a force to the movable member, a readout member, and means coupling the readout member to the movable member.

An embodiment of the invention is described hereunder in some detail with reference to and as illustrated in the accompanying drawings, in which.

Figure 3:
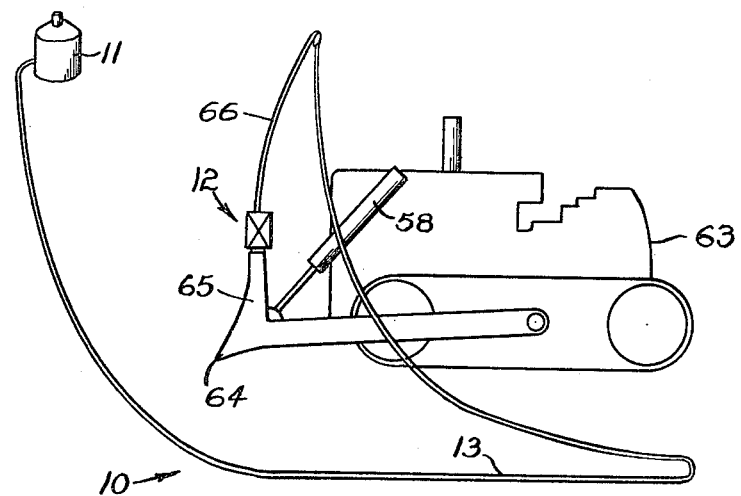
Figure 1:
FIG. 1 is a diagrammatic illustration of a level indicating instrument having a hand carried pressure responsive element.
Figure 4:
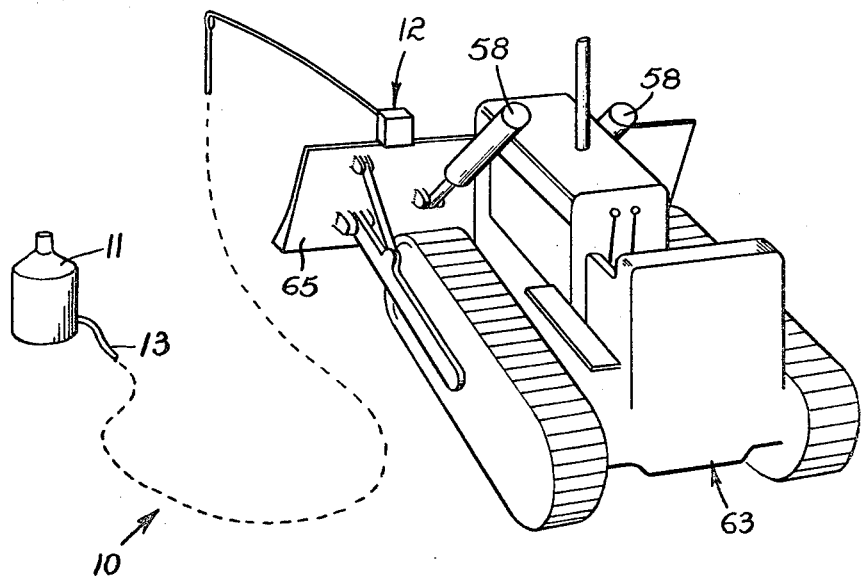
Figure 5:
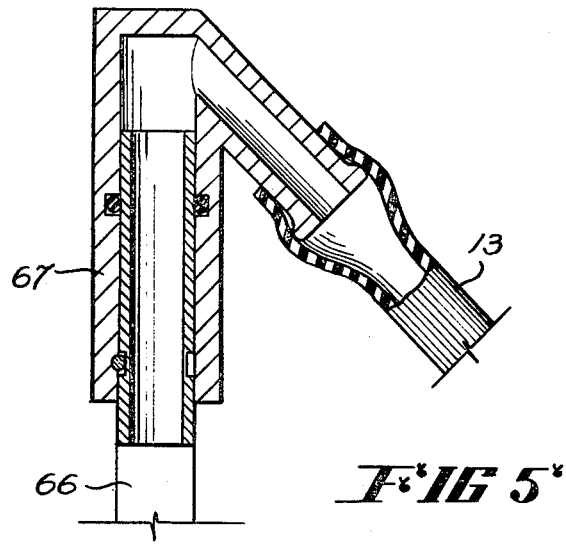
Figure 6:
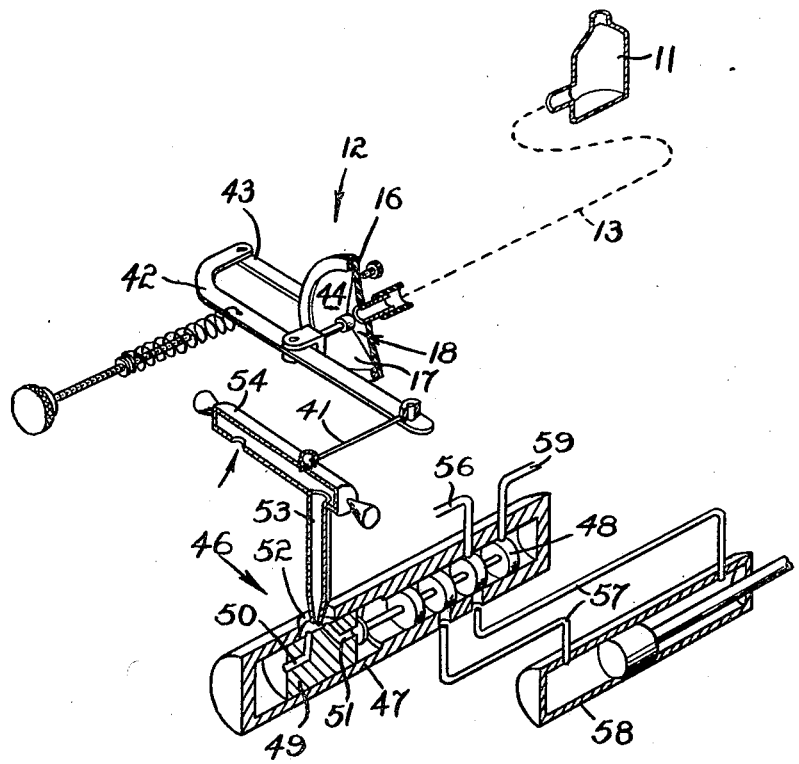

FIG. 3 is a diagrammatic illustration of an earth moving machine having a level indicating instrument controlling a bull-dozer blade as a transducer, FIG. 4 is a perspective view of FIG. 3, FIG. 5 is a section through a swivel used on the machine of FIGS. 3 and 4, and FIG. 6 is a diagrammatic representation of the pressure responsive element of the instrument of FIGS. 3 and 4, with servo control means attached thereto.

According to this embodiment a level indicating instrument 10 is provided with a reservoir 11, a pressure responsive element 12, and a flexible hose 13 interconnecting the reservoir with the pressure responsive element. The pressure responsive element has walls 16 defining with a flexible diaphragm 17 a pressure space 18.

Figure 2:
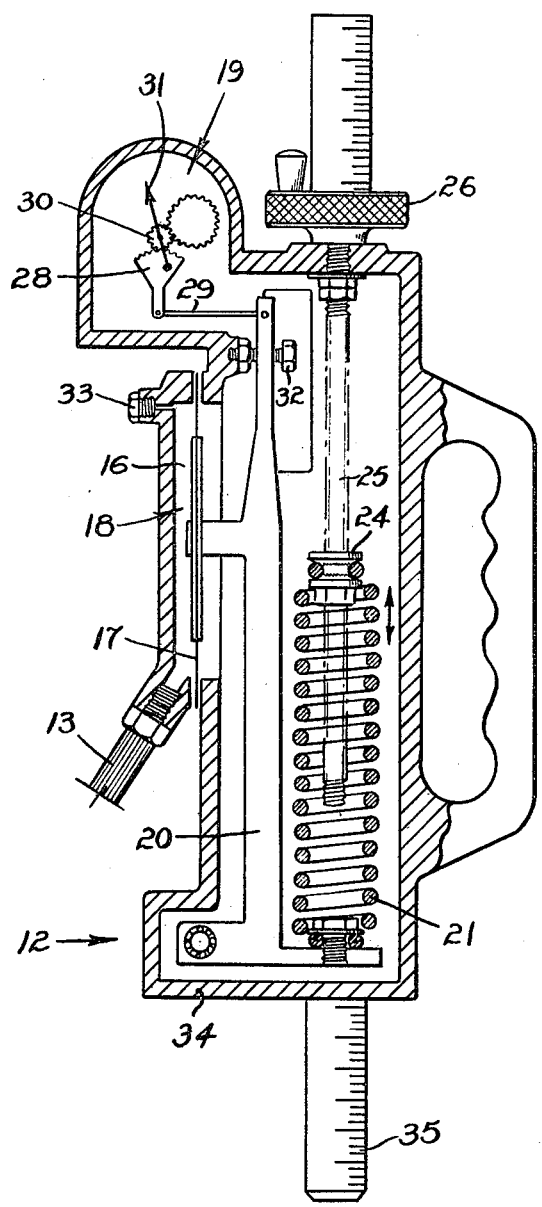
FIG. 2 is a section through a hand carried pressure responsive element.

In the embodiment of FIG. 2 which illustrates a hand carried instrument, the diaphragm 17 constitutes a movable member which is coupled to a readout member 19 by means of a bell crank lever 20, while a spring 21 is arranged to apply a pressure to the diphragm 17 through the bell crank 20. The direction of this pressure will be such as to urge the diaphragm in a direction to reduce the volume of pressure space if the reservoir is positioned above the diaphragm, that is, there is a super-atmospheric pressure in the pressure space 18, but to decrease the volume of the pressure space if the reservoir is below the diaphragm and the pressure in the pressure space is sub-atmospheric. Achievement of this double action, making it possible to position the reservoir either above or below the hand piece, is effected by having the spring 21 anchored at its two ends so that it will function either as a compression spring or as a tension spring. In the alternative separate springs can be used, one always in tension and one always in compression, if it is desired to overcome any "lost motion" between the bell crank and the spring as the spring passes through the phase of zero pressure.

The upper end of the spring 21 engages a nut 24 which threadably engages a spring loading screw 25, the upper end of the screw 25 being provided with an adjusting wheel 26 which enables adjustment to be accurately effected.

The upper end of the bell crank 20 is coupled to a quadrant 28 by means of a link 29, the quadrant 28 having accurately formed teeth thereon which engage a pinion 30 carrying a pointer 31 which passes over a calibrated clock face type of dial (not shown) calibrated for example in inches and feet. The limit of movement of the pointer 31 is controlled by means of a travel limit adjusting screw 32. The pressure space is provided with a bleed screw 33 to simplify removal of air from the system, this of course being essential. The lower surface 34 of the hand piece is flat and constitutes a datum surface. The hand piece is also provided with a calibrated rod 35, the arrangement being such that in use the pointer may be adjusted to a zero position, and measurements read from the calibrated rod 35.

Referring now to the embodiment which is illustrated in FIGS. 3, 4, 5 and 6, the readout member is constituted by a coupling link 41 which couples the movable member 42 to the diaphragm 17. The movable member 42 is constituted by a lever arm which is hinged to a bracket 43 fixed relative to the walls 16 of the pressure responsive element, and a pin 44 joins the diaphragm 17 to the movable member 42.

The servo device 46 can of course be any one of a large number of known types, for example electrical, hydraulic or magnetic, but in this embodiment a known type of hydraulic servo valve is described and illustrated. This is constituted by a spool valve 47 containing a spool 48 coupled to a piston 49 with which it is co-axial. The piston 49 is provided with a pair of apertures designated 50 and 51 and these open through the side wall of the piston 49 and access to the apertures is obtained through an opening 52 in the side wall of the spool valve 47. A jet 53 depends from a rocking arm 54 and receives a pressure from hydraulic pump means (not shown). This arm 54 is coupled by the coupling link 41 (which constitutes the readout member) to the diaphragm 17. The arrangement is such that the jet 53 directs a flow of oil into one or other of the apertures 50 or 51, or alternatively partly into both. This provides an analogue type control for control of displacement of the spool 48.

The spool valve 47 is provided with pressure feed through the conduit 56, and this pressure feed is directed into either one of the two conduits 57 of the operating ram (or rams) 58, and the conduit 59 is a drain conduit and functions in the normal way.

Referring now to FIGS. 3 and 4 a tractor 63 is provided with a pair of rams 58 which control the elevation of the operating edge 64 of a bull-dozer plate 65, the bull-dozer plate 65 however carrying on it a pressure responsive element 12, and this is coupled through the hose 13 to the reservoir 11. The arrangement is such that upward displacement of the bull-dozer plate will deflect the diaphragm so as to in turn deflect the jet 53 and tend to apply a downward pressure on the bull-dozer plate through the rams 58, the reverse action also taking place if the plate 65 tends to drop. The servo control valve is provided with a boom 66 having at its upper end a swivel 67 slidably engaging the boom, the swivel 67 having the hose 13 secured to it. This reduces danger of damage to the hose 13.

A consideration of both the above embodiments will indicate that the invention provides a very simple device which is small and compact and is not dependent upon accurate reading of liquid level. If the reservoir is large in diameter compared with the diameter of the diaphragm variations in liquid level between readings of varying elevation will be negligible. The device can be used with the pressure responsive element either above or below the reservoir without necessarily sacrificing accuracy. The device can be operated by a single operator in the case of the device of FIG. 2 and if needed becomes entirely automatic if a servo control mechanism is used as shown in FIGS. 3 to 6. Any number of indications can be used at various elevations with one reservoir without interconnection, and no levelling or adjusting of the reservoir is required, the only requirement being that the reservoir should not be relocated while readings are being made.

It will of course be appreciated that the design of spring and the material of the diaphragm is important if high degrees of accuracy are required, but high accuracy is nevertheless obtainable if springs and diaphragms are constructed according to known art.

What I claim is:

1. Level indicating instrument having a reservoir, a pressure responsive element, a flexible hose interconnecting the reservoir with the pressure responsive element, the pressure responsive element having walls and a diaphragm defining a pressure space, a helical spring applying a force to the diaphragm, a readout member, a lever coupling the readout member to the diaphragm, anchor means on one end of the spring securing the spring to the lever, a screw threaded spring adjustment member carried by and movable relative to the pressure responsive element, and second anchor means on the spring adjustment member securing the other end of the spring thereto, so constructed and arranged that the spring will urge the diaphragm in a direction to reduce the pressure space volume when super-atmospheric pressure exists in the pressure space, or alternatively in a direction to increase the pressure space volume when sub-atmospheric pressure exists in the pressure space.

2. Level indicating instrument according to claim 1 wherein the lever is of bell crank shape.

3. Level indicating instrument according to claim 2 wherein the readout member is constituted by a pointer, a pinion fixed relative to the pointer, a quadrant having teeth thereon meshing with the pinion, and means coupling the quadrant to the lever.

4. Liquid level indicating instrument according to claim 3 further having a calibrated rod carried by and movable relative to the pressure responsive element.

5. Liquid level instrument comprising a reservoir, a pressure responsive element, and a flexible hose interconnecting the reservoir with the pressure responsive element, the pressure element having walls and a movable diaphragm defining therewith a pressure space, the flexible hose being in fluid flow communication with the pressure space, a lever arm hinged to the walls and coupled to the diaphragm, a first spring anchor on the lever arm, a screw threaded spring adjustment member passing through an aperture in a wall of the pressure element, a second spring anchor on the spring adjustment member, a spring firmly secured at its ends to the spring anchors thereby being arranged to apply a force to urge the diaphragm in a direction to either increase or decrease the pressure space volume dependent upon whether the pressure therein is super-atmospheric or sub-atmospheric respectively, readout means, and a link extending between the lever and the readout means.

6. Liquid level instrument according to claim 5 wherein the readout means include a servo controlled mechanism.

7. Liquid level instrument according to claim 6 wherein the servo controlled mechanism is a servo controlled hydraulic valve.

8. Level indicating instrument having a reservoir, a pressure responsive element, a flexible hose interconnecting the reservoir with the pressure responsive element, the pressure responsive element having walls and a movable member defining a pressure space, a readout member, coupling means coupling the readout member to the movable member, a spring secured at its one end to the coupling means and at its other end to the pressure responsive element, so constructed and arranged that the spring will urge the diaphragm in a direction to reduce the pressure space volume when super-atmospheric pressure exists in the pressure space, or alternatively in a direction to increase the pressure space volume when sub-atmospheric pressure exists in the pressure space.

References Cited
UNITED STATES PATENTS

| | | | |
|---|---|---|---|
| 2,672,758 | 3/1954 | Hibbard | 73—432 |
| 2,752,949 | 7/1956 | Jones | 73—406 |

S. CLEMENT SWISHER, Primary Examiner

U.S. Cl. X.R.

33—209